Figure 5:
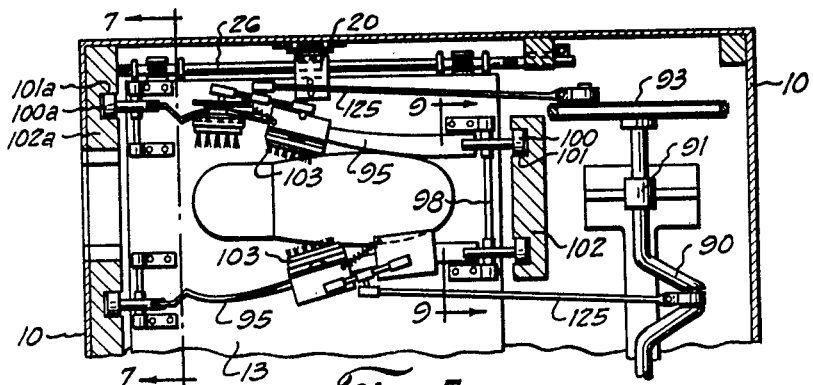

Aug. 3, 1943.   T. L. FINLEY   2,325,843
SHOESHINING APPARATUS
Filed April 15, 1940   7 Sheets-Sheet 1
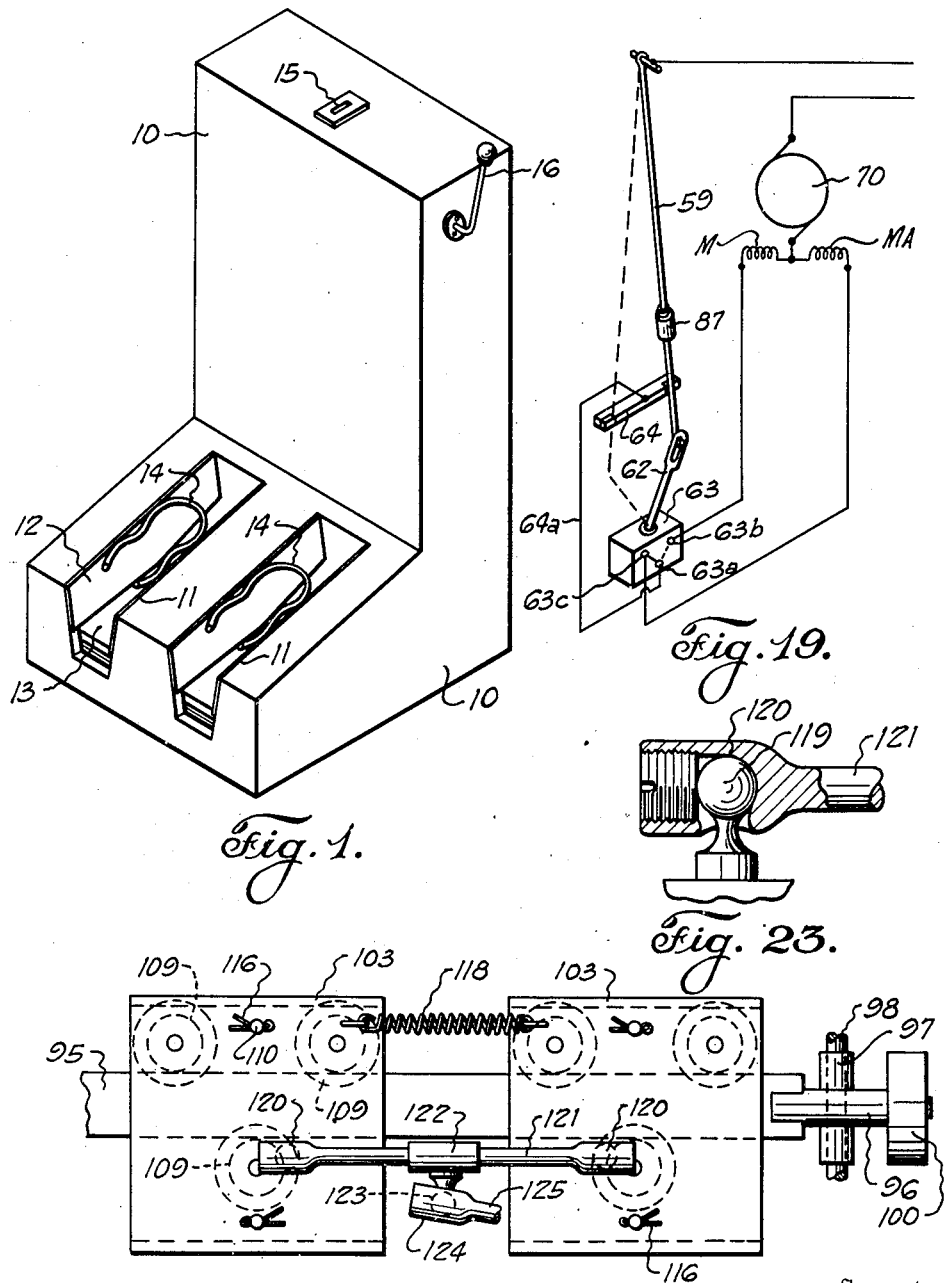
Inventor
Tilbert L. Finley

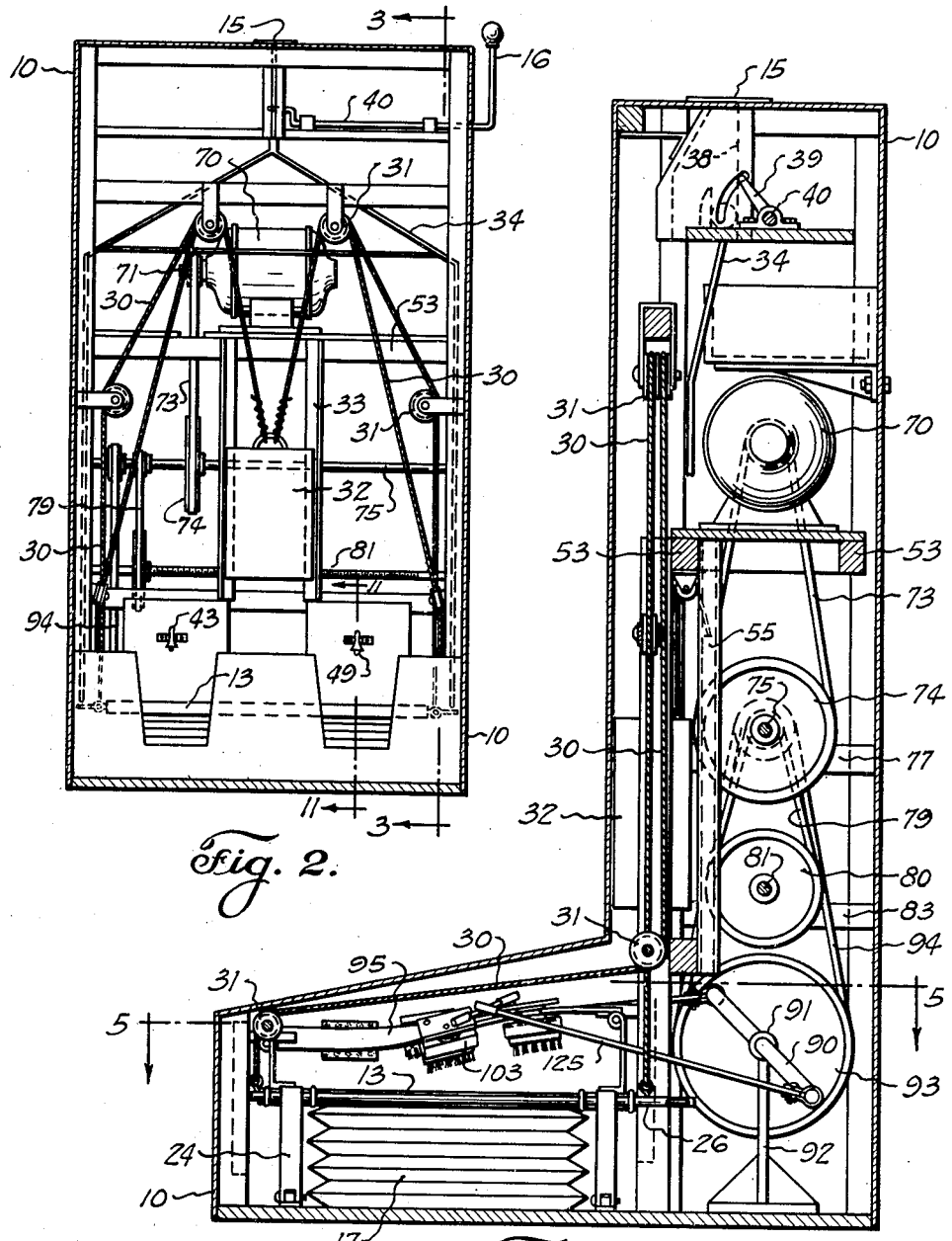

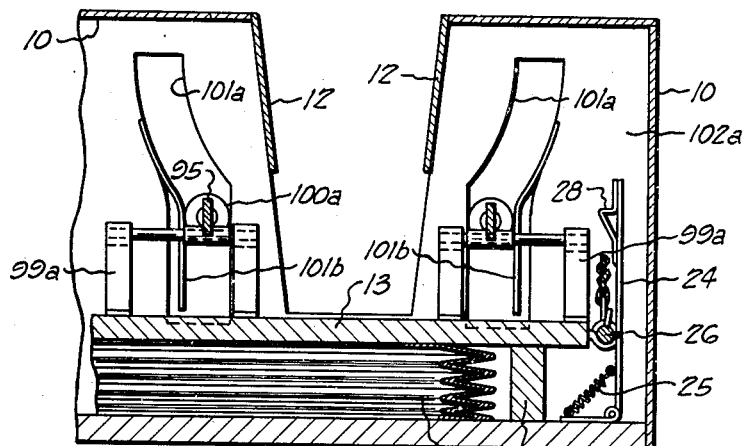
Fig. 8.
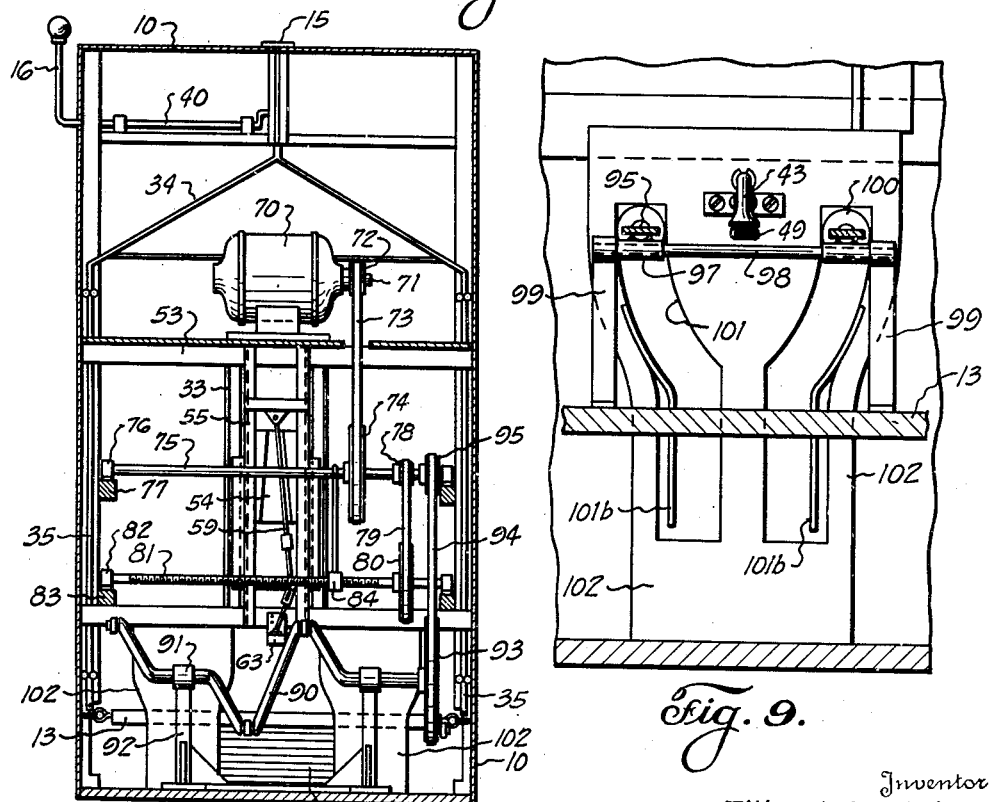
Fig. 9.
Fig. 4.
Inventor
Tilbert L. Finley
By Jack A. Ashley
Attorney Aug. 3, 1943.   T. L. FINLEY   2,325,843
SHOESHINING APPARATUS
Filed April 15, 1940   7 Sheets-Sheet 4

Inventor
Tilbert L. Finley
By Jack A. Athley
Attorney

Aug. 3, 1943.  T. L. FINLEY  2,325,843
SHOESHINING APPARATUS
Filed April 15, 1940  7 Sheets-Sheet 5

Inventor
Tilbert L. Finley

By Jack A. Ashley

Attorney

Aug. 3, 1943.    T. L. FINLEY    2,325,843
SHOESHINING APPARATUS
Filed April 15, 1940    7 Sheets-Sheet 6

Inventor
Tilbert L. Finley
By Jack A. Ehley
Attorney

Aug. 3, 1943.  T. L. FINLEY  2,325,843
SHOESHINING APPARATUS
Filed April 15, 1940  7 Sheets-Sheet 7

Inventor
Tilbert L. Finley
By Jack A. Ashley
Attorney

Patented Aug. 3, 1943

2,325,843

UNITED STATES PATENT OFFICE 2,325,843

SHOESHINING APPARATUS

Tilbert L. Finley, Bonham, Tex.

Application April 15, 1940, Serial No. 329,614

12 Claims. (Cl. 15—33)

This invention relates to new and useful improvements in shoe shining apparatus.

One object of the invention is to provide an improved apparatus for shining or polishing shoes which is entirely automatic in its operation and which may be coin-controlled so that the apparatus is actuated upon the insertion of a coin, whereby said apparatus is adaptable for use in public places and requires no attendant.

An important object of the invention is to provide an improved shoe shining apparatus wherein the various operating parts are controlled by a single depressible member which is arranged to be depressed by the weight of the person operating the apparatus, whereby the construction is simplified and also whereby the apparatus cannot operate unless the shoes of the person are in proper position within the machine.

Another object of the invention is to provide an improved apparatus, of the character described, wherein gravity actuated weights or elements are employed in conjunction with the depressible member, for controlling actuation of the apparatus, whereby springs, and the like, which are subject to wear and fatigue, are eliminated and positive and efficient operation is assured.

A further object of the invention is to provide an improved apparatus for shining shoes having an electric motor for driving the reciprocating brushes which perform the brushing operation, together with an improved switch arrangement for controlling the energization of said motor, whereby the motor is actuated for a predetermined length of time to reciprocate the brushes for a predetermined length of time, upon each operation of the apparatus.

Still another object of the invention is to provide an improved apparatus, of the character described, which includes a depressible support or platform which is so arranged that upon initial movement thereof, a polish or cleaner is applied to the shoes, continued depressing of the platform resulting in an actuation of the brushes to complete the shining or polishing of the shoes; said platform being normally locked in a raised position and having a coin-controlled operator associated therewith, whereby said platform cannot be depressed until a coin is inserted into the apparatus.

A still further object of the invention is to provide an apparatus, of the character described, wherein an electric motor furnishes the power for operating the device, said motor being controlled by an improved switch arrangement which includes a travelling control element movable on a threaded shaft; the switch arrangement being such that the field of the electric motor is reversed upon each operation, whereby the travelling control element travels back and forth on its shaft, moving in one direction upon each operation of the motor; such switch arrangement permitting a positive control of the length of time that the motor is energized and also permitting the use of a single motor, which simplifies the construction.

A particular object of the invention is to provide an improved brush assembly for a shoe shining apparatus, wherein the brushes are guided over curved tracks which are shaped so as to move said brushes over the entire surface of the shoes in a manner substantially similar to the manner in which a brush would be manually moved over the shoe, whereby efficient polishing and shining of the shoes is accomplished.

Another object of the invention is to provide an improved brush assembly including a plurality of brushes, each of which is mounted within a carrier; each brush being resiliently or yieldably mounted within its carrier so as to be capable of a tilting movement relative thereto and each carrier being secured to its operating member through a universal joint so that the carrier may undergo universal movement with relation to such member, the mounting of the brushes in this manner permitting said brushes to follow the contours or outer surfaces of the shoes, whereby an efficient brushing action is accomplished.

Still another object of the invention is to provide an improved brush assembly having its brushes normally held out of shoe brushing position, whereby the shoes to be shined may be readily disposed therebetween; together with means for automatically moving the brushes into engagement with the shoes upon operation of the device.

A construction designed to carry out the invention will be hereinafter described, together with other features of the invention.

Figure 6:
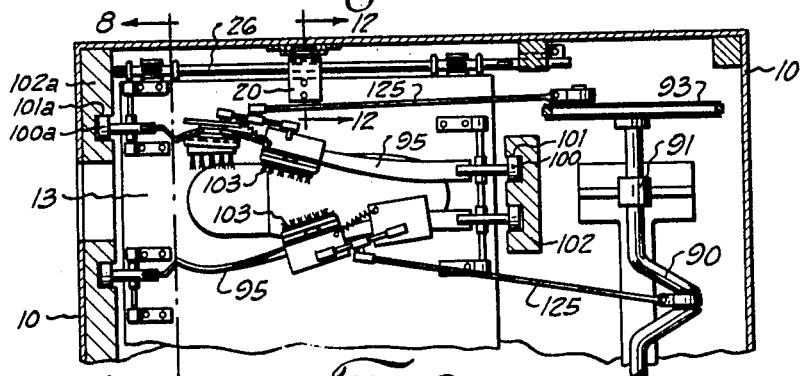
Figure 7:
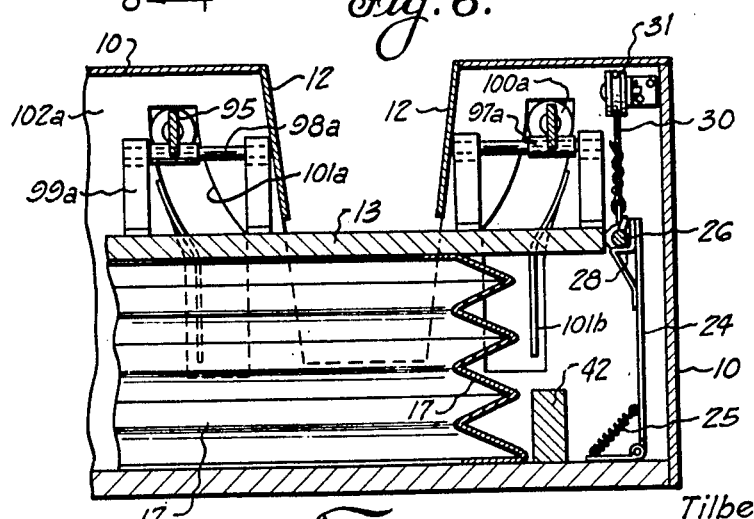
Figure 21:
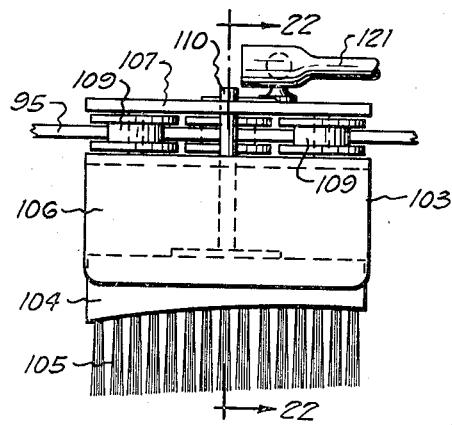
Figure 22:
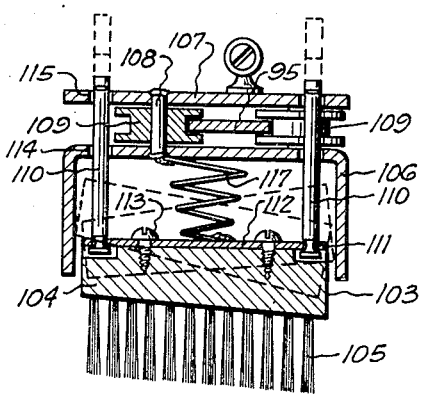
Figure 10:
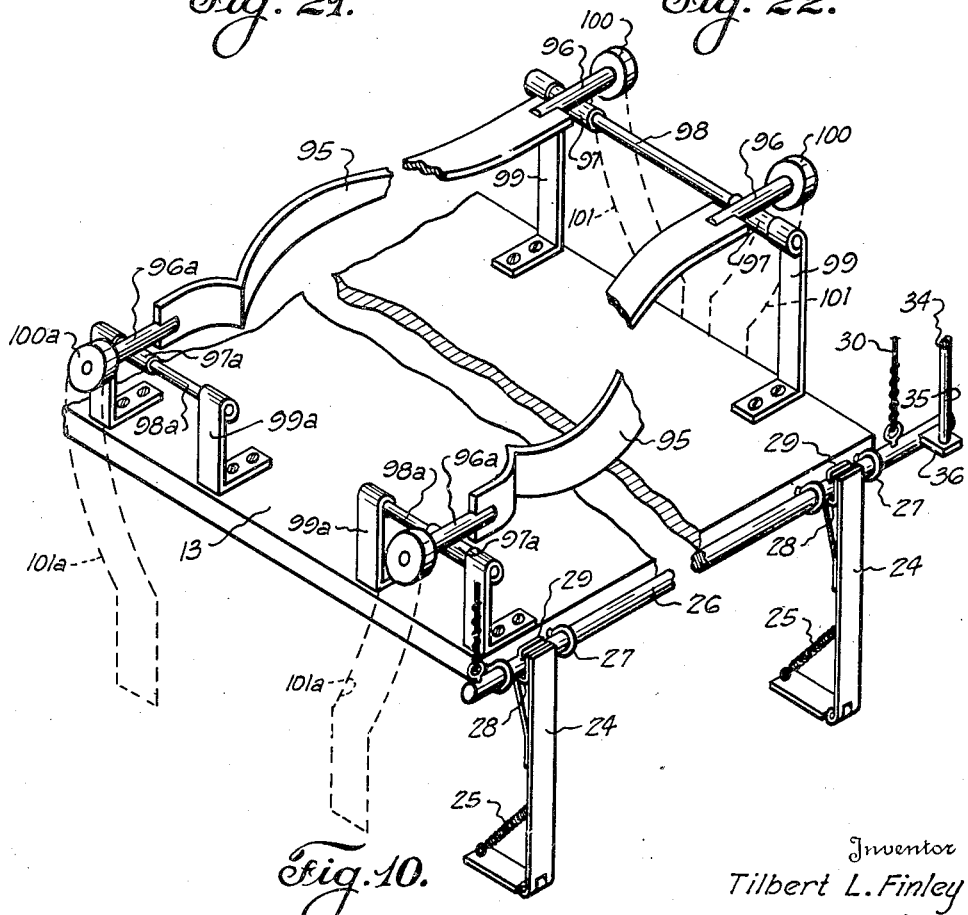
Figure 11:
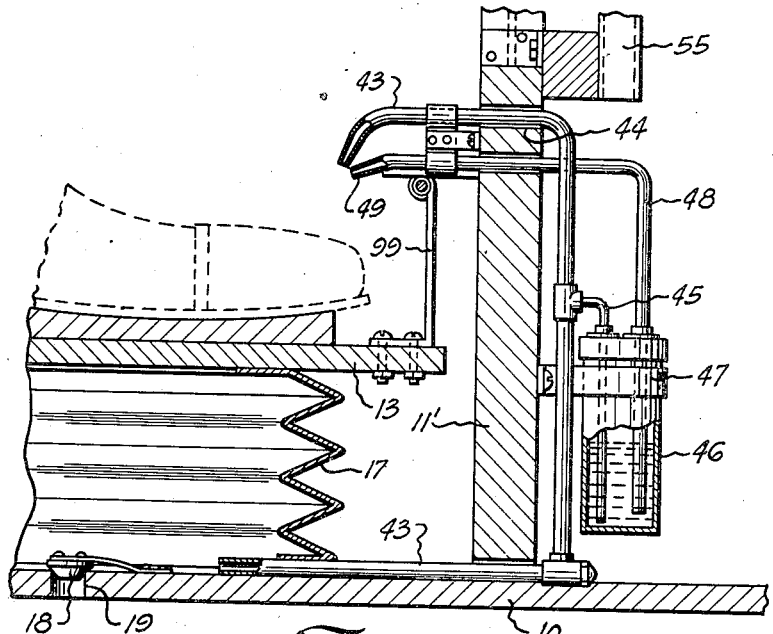
Figure 12:
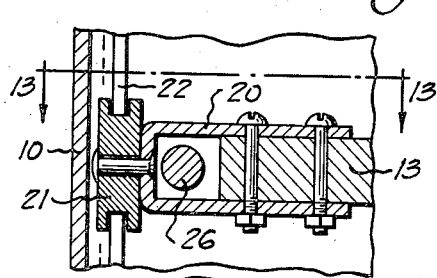
Figure 14:
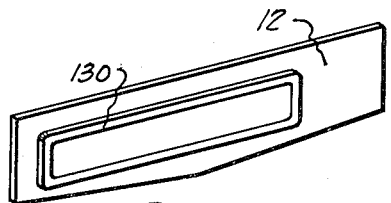
Figure 13:
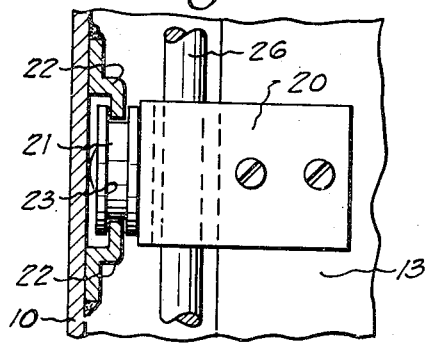
Figure 24:
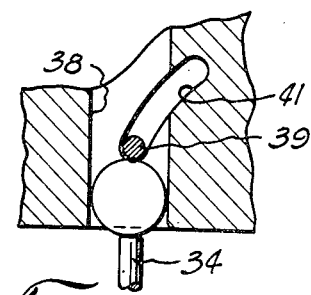
Figure 15:
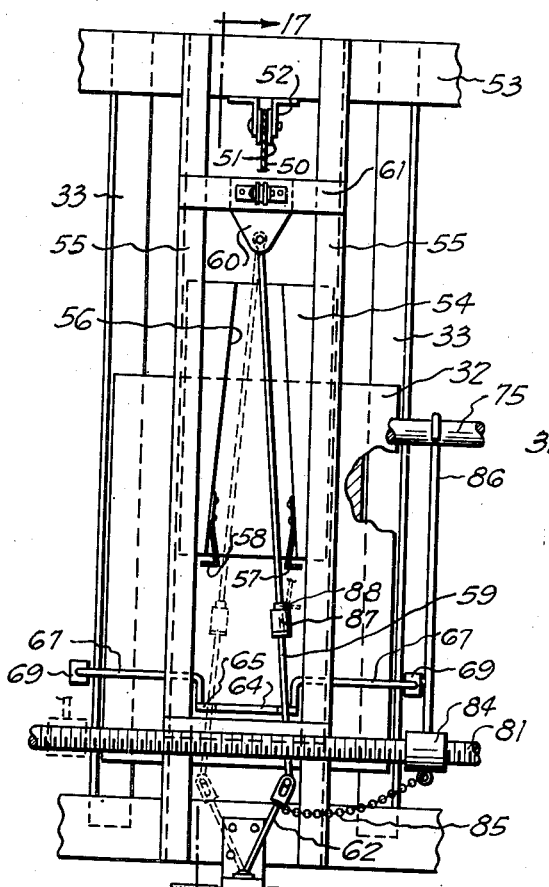
Figure 17:
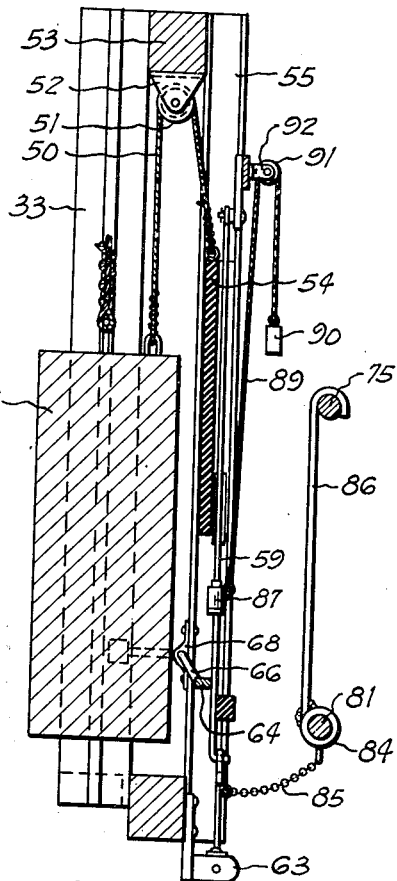
Figure 16:
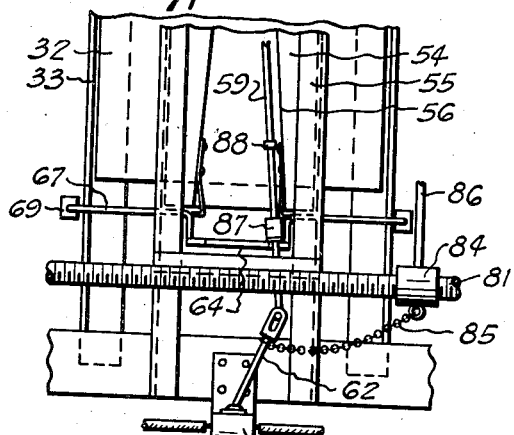
Figure 18:
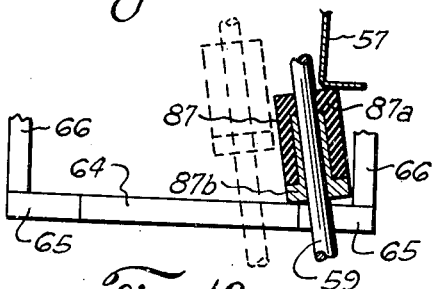

The invention will be more readily understood from a reading of the following specification and by reference to the accompanying drawings, in which an example of the invention is shown, and wherein:

Figure 1 is an isometric view of a shoeshining apparatus, constructed in accordance with the invention, Figure 2 is a front elevation of the apparatus, with the outer casing removed to show the interior construction, Figure 3 is an enlarged, transverse, vertical sectional view, taken on the line 3—3 of Figure 2, Figure 4 is a rear elevation of the apparatus, with the outer casing removed, Figure 5 is a horizontal, cross-sectional view, taken on the line 5—5 of Figure 3, and illustrating one of the brush assemblies in its raised position, Figure 6 is a view similar to Figure 5, showing the brushes lowered to a position in engagement with the shoe, Figure 7 is a partial transverse vertical sectional view, taken on the line 7—7 of Figure 5, Figure 8 is a view similar to Figure 7, taken on the line 8—8 of Figure 6, Figure 9 is an enlarged, transverse vertical sectional view, taken on the line 9—9 of Figure 5, Figure 10 is an enlarged, partial isometric view, showing the mounting of the guide track for the brushes on the depressible platform or support, Figure 11 is an enlarged, transverse vertical sectional view, taken on the line 11—11 of Figure 2 and illustrating the apparatus for applying polish or cleaner to the shoe, Figure 12 is an enlarged, transverse, vertical, sectional, view, taken on the line 12—12 of Figure 6, Figure 13 is a horizontal cross-sectional view, taken on the line 13—13 of Figure 12, Figure 14 is an isometric view of one of the guard plates, illustrating the inner side thereof which has the paste polish mounted thereon, Figure 15 is an enlarged elevation of the rear portion of the device, illustrating the switch arrangement, said switch being in an open position, Figure 16 is a view of the lower portion of Figure 15 showing the switch in circuit closing position, Figure 17 is a transverse, vertical, sectional, view, taken on the line 17—17 of Figure 15, Figure 18 is an enlarged detail of the contact members which close the circuit through the switch arrangement, Figure 19 is a wiring diagram, illustrating the connection between the switch arrangement and the motor, Figure 20 is a plan view of one of the brush assemblies, Figure 21 is a side elevation of one of the brush units, Figure 22 is a transverse, vertical, sectional, view taken on the line 22—22 of Figure 21, Figure 23 is an enlarged sectional detail of one of the universal joints of the brush unit, and Figure 24 is an enlarged sectional detail of the coin slot and its actuating members.

In the drawings, the numeral 10 designates a casing or housing, which is substantially L shaped and which may be constructed of wood, metal, or other suitable material. As illustrated, the lateral or horizontal portion of the casing is provided with a pair of openings or recesses 11 within which the shoes of the person operating the device are adapted to be positioned. The sides of the recesses 11 are provided with guard plates or panels 12 which extend throughout the longitudinal length of the recesses. The lower ends of the recesses 11 are closed by a depressible support or platform 13 which is positioned within the interior of the casing 10. A person standing on the platform 13 has his shoes disposed between the plates 12 and the recesses 11 and for preventing the cuffs of the persons trousers from entering the recesses 11, a pair of guard members 14 are provided, one being mounted within the upper end of each recess. Obviously, when the shoes are located on the platform within the recesses 11, the lower ends of the trousers rest on the guards 14 and thus, danger of the trousers being soiled during the polishing operation, is avoided. The casing is provided with coin slot 15 at its upper end and an operating lever 16, which is associated with the coin slot, as will be explained. After the person has stepped on the platform 13, a coin is inserted in the slot 15 and the lever 16 is operated. Such operation of the lever permits a lowering of the platform 13 and such lowering sets the various parts into operation, as will be hereinafter explained.

The platform 13 is substantially rectangular in shape and the upper end of a depressible bellows 17 is secured to the underside of said platform (Figures 3 and 7). The lower end of the bellows 17 is suitably secured to the bottom of the casing 10. Manifestly, when the platform 13 is in its upper or raised position, the bellows is expanded, and similarly, when the platform is lowered, said bellows is collapsed. A check valve 18 (Figure 11) closes an opening 19 provided in the bottom of the casing 10 and this check valve permits the admission of air into the interior of the bellows 17 when the platform is moved from a lowered to a raised position.

For guiding the platform 13 in its vertical movement within the casing, each side of the platform is provided with a U-shaped bracket 20 and this bracket extends outwardly therefrom, as is illustrated in Figures 5, 6, 12 and 13. The outer end of the bracket 20 has a guide wheel 21 mounted thereon and said wheel is slidable within a track 22 which extends vertically on the inner wall of the casing and which engages an annular groove 23 formed in the wheel. Manifestly, with this arrangement, the platform is guided in its vertical movement within the casing and is maintained in a proper position during such movement.

For holding the platform 13 in its raised position, until such time as a coin is inserted in the slot 15, a pair of latching bars 24 are mounted at each side of the platform. As is clearly shown in Figures 7 and 10, each bar 24 has its lower end pivoted to the bottom of the casing 10 and a coil spring 25 which is secured to the bar urges said bar inwardly toward the platform 13. A rotatable shaft 26 extends contiguous to each side of the platform 13 and is fastened thereto by means of U-bolts 27, or other suitable means. Each shaft is adapted to rest upon angular lugs 28 which are formed at the upper ends of the bars 24 and since said shafts 26 are secured to the platform 13, it is evident that when the shafts are in engagement with the lugs 28, a downward movement of the platform 13 is prevented. Opposite each latch bar 24, each shaft 26 is provided with a radially extending projection 29 and when each shaft 26 is rotated, this projection engages the upper end of the bars to swing the same outwardly under tension of the spring 25. Therefore, when each shaft 26 is rotated to swing the bars 24, the lugs 28 of said bars are moved from beneath the shafts 26 to permit said shafts, and the platform 13 secured thereto, to be lowered. For counterbalancing the platform 13, a pair of cables 30 are secured to the ends of each shaft 26. These cables extend upwardly over suitable guide pulleys and rollers 31 (Figure 2) and have their opposite ends secured to a counterbalance weight 32. The weight 32 is slidable vertically between guide rails 33 which are mounted within the central portion of the casing 10. When the platform 13 is depressed or lowered, the counterbalance weight 32 is raised within its track 33. Similarly, when the weight of the person is removed from the platform 13, the counterbalance weight 32 will immediately return the platform to its uppermost position.

For rotating the shafts 26 in order to disengage the latch bar 24 to permit lowering of the platform 13, a yoke-shaped operating member 34 is provided (Figure 2). The vertical rods 35 of the yoke member 34 extend downwardly contiguous to each side of the casing 10 and the lower end of each rod is arranged to engage a radial lug 36 which lug is formed on one end of the shafts 26. It is obvious that when the member 34 is moved downwardly within the casing, the lower ends of the rods 35 engage the lugs 36 and swing the same downwardly, whereby a rotation is imparted to the shafts 26. Upon rotation of the shafts 26, the projection 29 thereon will engage the upper ends of the latch bars 24 and swing the same outwardly to move the lugs 28 from beneath the shafts 26. When this occurs, the platform 13 may be moved downwardly.

For operating the member 34, that is, to move the same downwardly in order to effect unlatching of the platform 13, the coin slot 15 has a coin chute 38 associated therewith and located immediately therebelow (Figures 3 and 24). The upper end of the member 34 extends into the lower end of the coin chute 38, whereby a coin inserted into the slot 15 will move downwardly through the chute and into engagement with the extreme upper end of the member 34. In order to effect a downward movement of the member 34, an arm 39 is formed at the inner end of an operating shaft 40, which shaft is adapted to be rotated by the hand lever 16 on the exterior of the casing. The arm 39 has its outer end bent inwardly so as to project through an arcuate slot 41 formed in the side wall of the coin chute 38. When the shaft 40 is rotated by the lever 16, the arm 39 is moved downwardly through the arcuate slot 41, whereby its inner projecting end strikes the upper end of the coin which has been inserted and imparts a downward movement thereto. This downward movement is transmitted through the coin to the member 34, whereby said member is lowered and the shafts 26 are rotated in the manner hereinbefore described. Of course, after the member 34 has moved downwardly, the coin may escape from the lower end of the coin chute.

From the foregoing, it will be seen that the depressible platform 13 is normally latched in a raised position and when a person steps on said platform, the same will not be lowered. A coin must be inserted in the slot 15 and the lever 16 must be operated to rotate the shaft 40 and impart a downward movement to the member 34, whereby the vertical rods 35 of said member may impart a rotation to the shafts 26. Such rotation of the shafts 26 will result in an outward swinging of the latch bars 24, whereby the platform 13 may move downwardly under the weight of the person standing thereon. Of course, as the platform moves downwardly, the bellows 17 secured to its underside is collapsed and at the same time the counterbalance weight 32 is lifted within its guide tracks 33. For limiting the downward movement of the platform 13, a suitable stop block 42 (Figure 7) may be secured to the bottom of the casing 10 below the outer edge portion of the platform and outside of the bellows 17.

For utilizing the downward movement of the bellows for spraying a liquid polish or paste onto the shoes within the recesses 11, a pair of pipes or conduits 43 each having one end disposed within the lower end of the bellows, as is clearly shown in Figure 11. Each pipe 43 extends upwardly and passes through an opening 44 provided in the end wall 11' of each recess. The extreme outer end of each pipe 43 overlies the toe of the shoe within said recess. One of the pipes 43 is provided for each recess 11 and each pipe communicates intermediate its ends through a tube 45 with the interior of the liquid container 46. The container 46 is secured to the central portion of the end wall 11' of the recesses 11 by means of a suitable strap 47 and said container is provided with a pair of outlet tubes or pipes 48, one of said pipes leading to each of the recesses 11. The outer ends of the pipes 48 are formed with a nozzle 49 which terminate adjacent the outlet end of the pipes 43. With this arrangement, the air which is forced out of the bellows 17 as the platform 13 is depressed is ejected through the pipes 43. A portion of this air is forced downwardly through the tube 45 into the liquid within the container 46, whereby liquid is forced upwardly through the outlet 48. The air escaping from the outlet end of the pipes 43 forms an atomizing effect at the nozzles 49 whereby a suction is created to draw liquid from the container 46. This liquid is of course sprayed onto the toes of the shoes within the recesses 11. Although only a single liquid container 46 has been illustrated, it is manifest that one may be provided for each recess. Also, the spray nozzles 49 have been shown as located over the toes of the shoe and if desired, additional nozzles could be provided for spraying the liquid polish or cleaner onto the sides or other portions of the shoes.

As the platform 13 moves downwardly to force the air from below said platform and outwardly through the pipes 43, counterbalancing weight 32 is of course pulled upwardly on its guide track 33 because of the connection between the platform and said weight through the cables 30. A cable 50 has one end secured to the weight 32 and passes upwardly over a pulley 51 which is mounted between ears 52 which are secured to a cross beam 53 provided within the casing 10. The other end of the cable 50 is suitably fastened to an actuating block 54, which block is slidable vertically between a pair of channel members 55, which extend vertically within the casing 10. Thus, as the counterbalancing weight 32 moves upwardly between its guide track 33, the actuating block 54 is moved downwardly within the channels 55. The actuating block 54 is formed with a vertical recess or groove 56 which extends throughout its entire length and a pair of spring lugs 57 and 58 are secured to the lower end of the side walls of the recess 56, as is clearly shown in Figures 15 and 16.

A contact rod 59 has its upper end pivoted to a bracket 60 which depends from a cross bar 61, which bar spans the upper portion of the channels 55. The contact rod extends downwardly through the vertical recess 56 of the actuating block 54 and has its extreme lower end secured by means of a pin and slot to the upper end of the operating lever 62 of a toggle switch 63. It is necessary that the lower end of the contact rod 59 be suitably insulated from the operating lever 62 at the switch. The lower portion of the contact rod 59 is in constant engagement with a contact bar 64, which bar has an insulated portion 65 at each end thereof. The bar is secured to arms 66 which are preferably formed integral with a shaft 67. The shaft is mounted in bearings 68 (Figure 17) which are secured to the channels 55 and the outer end of each shaft 67 is provided with a weighted arm 69. The weight at the ends of the arms 69 serve to rotate the shaft 67 in a direction which urges the contact bar 64 into engagement with the contact rod 59.

When the switch 63 has its lever 62 in the position shown in Figure 15, the lower portion of the contact rod 59 is in engagement with one insulated end of the contact bar 64. As will be explained, the rod 59 is adapted to conduct electrical current and in such position of said rod, there is no current flow. Similarly, when the rod 59 is swung to the position shown in dotted lines in Figure 15, said rod engages the opposite insulated end of the contact bar 64 and there is no flow of current. However, when the rod 59 is engaging the bar proper, there is a current flow from said rod and to the bar 64.

The flow of current from the contact rod 59 to the contact bar 64 controls the flow of current to an electric motor 70, which motor is suitably mounted on the crossbeam 53. The motor is provided with two windings M and MA (Figure 19), whereby said motor may rotate its shaft 71 (Figure 2) in either direction. The motor shaft 71 is provided with a pulley 72 and an endless belt 73 passes over the pulley 72 and also over a pulley 74, which latter pulley is secured to a jack shaft 75. The jack shaft 75 has its ends mounted in suitable bearings 76 which are located within the casing and which are supported on suitable supporting bars 77. As is fully shown in Figures 2 and 4, the jack shaft 75 extends transversely across the interior of the casing behind the guide rails 33 and the channels 55 and obviously, when the motor 70 is operated, the jack shaft is rotated. In addition to the pulley 74, the jack shaft is provided with a smaller pulley 78 which has connection through an endless belt 79 with a pulley 80, the latter being fastened on a threaded shaft 81. The shaft 81 also extends transversely within the casing, being disposed below the shaft 75 and has its ends mounted in bearings 82 which are supported on suitable supporting bars 83. Thus, it will be seen that the motor not only drives the jack shaft 75 but also imparts a rotation to the threaded shaft 81.

The threaded shaft 81 has a collar 84 threaded thereon and this collar is connected to the operating lever 62 of the switch 63 by means of a chain, or other flexible connection 85. To prevent rotation of the collar 84, whereby a rotation of the shaft 81 will impart movement to the collar, said collar has an upwardly extending rod 86 which passes upwardly and over the jack shaft 75, as is clearly shown in Figure 15. Therefore, when the motor is operated to rotate the threaded shaft 81, the collar 84 is moved longitudinally of the threaded shaft 81.

Assuming the toggle switch lever 62 to be in the position shown in Figure 15, it will be evident that the contact rod 59 is engaging one insulated end of the bar 64 and at this time there is no current flowing to the electric motor 70. As the platform 13 is depressed by the weight of a person stepping thereon and the insertion of a coin, as has been explained, the counterbalancing weight 32 is lifted upwardly along the guide rails or tracks 33. This upward movement of the weight results in a downward movement of the actuating block 54 and as said block moves downwardly, the angular lug 57 at the lower end thereof strikes a collar 87 which is slidably mounted on the contact rod 59. It is noted that the collar 87 is normally held in an uppermost position against a stop ring 88 which is fastened on the rod 59 by means of a cable 89 and weight 90. As clearly shown in Figure 17, the cable 89 passes over a pulley 91 which is mounted in brackets 92 secured to the channel 55.

As the actuating block 54 continues its downward movement, the collar 87 is moved downwardly on the rod 59. The collar 87 includes an insulated portion 87a and a metallic sleeve 87b, the metallic sleeve being in engagement with and having electrical connection with the rod 59. The metallic sleeve of the collar 87 moves downwardly until it engages the top of the contact bar 64 and as soon as this occurs, an electrical circuit is closed between the rod 59 and the bar 64 to one of the windings of the motor 70 to rotate the motor shaft 71 in one direction. As soon as the motor begins to operate, the shaft 81 is rotated to impart a longitudinal movement to the collar 84 which is threaded on said shaft (Figure 15). The motor 70 continues to operate until the collar 84 has moved along the shaft 81 to the position shown in Figure 15, in which position the flexible connection 85 between said collar and the operating lever 62 of the toggle switch 63 has imparted a swinging movement to said toggle lever. When the toggle lever is swung, the lower end of the contact rod 59 is swung to the position shown in dotted lines in Figure 15, moving across the contact bar 64 and to the opposite insulated end thereof. As soon as the rod 59 has swung a sufficient distance to move the collar 87 thereon from beneath the actuating lug 57 of the block 54, the weight 90 immediately returns the collar 87 upwardly against the stop ring 88 on said rod. Such movement of the collar 87 from beneath the lug 57 is indicated in dotted lines in Figure 18. Of course, after the rod 59 has been swung to a position shown in dotted lines in Figure 15, the circuit to the motor is again shut off since the electrical connection between the rod 59 and the contact bar 64 is broken. The movement of the rod 59 to this position moves the collar 87 into a position beneath the opposite lug 58 at the lower end of the actuating block 54, whereby upon the next actuation of the block, the collar 87 is again lowered into engagement with the contact bar, as has been explained. It is pointed out that when the toggle lever 62 is swung, it reverses the field of the motor so that upon the next closing of the electrical circuit thereto, the motor shaft 71 will rotate in an opposite direction. Upon opposite rotation of the motor shaft, the threaded shaft 81 will also be rotated in an opposite direction whereby upon the next succeeding operation the collar 84 will be moved longitudinally in an opposite direction along the threaded shaft 81.

The electrical connection between the operating rod, contact bar and the motor windings M and MA is clearly shown in Figure 19. As illustrated therein, the upper end of the contact rod 59 is connected to one side of an electrical supply. The contact bar 64 has connection through a wire 64a with a common contact 63a of the switch 63. The operating lever 62 of the switch 63 is adapted to close an electrical circuit between the common contact 63a and either a contact 63b or a contact 63c. The former contact 63b is connected to the winding M of the motor 70, while the contact 63c is connected to the winding MA of the motor. The other side of the motor is of course connected to the other side of the source of supply. From this, it is obvious that when the switch arm 62 is in the position shown in Figure 15, an electrical connection between the contact 63a and 63c is set up, whereby when the electrical circuit between the rod 59 and the contact bar 64 is closed, the winding MA of the motor will be actuated. However, when the toggle lever 62 is swung to the position shown in dotted lines in Figure 15, an electrical connection between the contact 63a and the contact 63b is made, whereby upon the next closing of the circuit through the rod 59 and the contact bar 64, the winding M of the motor will be energized. The provision of two windings in the motor, together with an alternate energization thereof makes possible the rotation of the threaded shaft 81 in opposite directions upon each succeeding operation of said motor. In this manner, the collar 84 which is threaded on the shaft 81 is reciprocated and travels back and forth on said shaft to swing the toggle lever 62 from one position to the other.

The electric motor 70 not only serves to rotate the threaded shaft 81 which functions to control the switch 63 but also serves to impart rotation to a crank shaft 90, which shaft is mounted in the lower end of the casing 10. The shaft is mounted in suitable bearings 91 which are carried by uprights or standards 92 which are secured to the bottom of the casing. One end of the crank shaft is formed with a drive pulley 93 and an endless belt 94 passes over this pulley. The belt 94 also passes over a pulley 95 (Figure 4) which is secured on the jack shaft 75 and manifestly, since the motor is utilized to drive the jack shaft, said motor imparts a rotation to the crank shaft 90. The crank shaft is employed to operate a pair of brush assemblies, which are disposed on each side of the recesses 11. One brush assembly is provided for each shoe and since both assemblies are constructed in exactly the same manner, it is believed that a description of one will suffice.

As is clearly shown in Figures 5, 6 and 10, each brush assembly includes a pair of guide tracks or rails 95, which extend across the entire width of the platform 13. Each track 95 comprises a flat bar which is twisted upon itself so that a portion thereof lies in a horizontal plane, while the remainder is disposed in a vertical plane. In addition to the twisting of the bar which forms each track or rail, said bar is curved in plan so as to generally follow the contour of a shoe. One end of each rail or track 95 has a pin 96 secured thereto and this pin is fastened to a sleeve 97, said sleeve being slidably mounted on a supporting rod or shaft 98. The ends of the shaft are mounted within the upper end of brackets 99 which are secured to and extend upwardly from the platform 13. The opposite end of each track rail is provided with a pin 96a which is fastened to a sleeve 97a, said sleeve being slidable on a shaft 98a. The shaft 98a is supported in upright brackets 99a which are secured to the platform 13. In this manner, it will be seen that the track rails 95 are carried by the platform 13 and are movable therewith. However, due to the mounting of said rails on the sleeves 97 and 97a, it will be manifest that said track rails may move inwardly and outwardly with relation to each other.

For imparting the inward and outward movement to the track rails, the pins 96 are provided with rollers 100. These rollers are slidable within offset grooves or recesses 101 formed within an upright block 102 which extends upwardly from the bottom of the casing 10 (Figures 5, 6 and 9). Similarly, the pins 96a at the opposite end of the track rails 95 are provided with rollers 100a which are slidable in offset grooves or recesses 101a which are provided in suitable blocks or members 102a which are secured to the wall of the casing 10. By observing Figures 8 and 9, the contour of the grooves 101 and 101a will be clearly seen. Manifestly, when the platform is in its raised position, the rollers 100 and 100a are in the upper portions of the grooves 101 and 101a, whereby the track rails are spread or spaced outwardly from each other. However, as the platform is depressed, the rollers 100 and 100a will move downwardly within the offset grooves 101 and 101a whereby the track rails will be moved inwardly towards each other. In their uppermost position, the track rails are disposed behind the guard panels 12, and when moved to their lowermost position, said rails move inwardly beneath the lower edge of said panels whereby they extend contiguous to the shoe of the person standing on the depressed platform.

Each track rail 95 has a pair of shoe brushes 103 mounted thereon and movable therealong. The brushes are constructed in exactly the same manner and such construction is clearly shown in Figures 21 and 22. Each brush includes the usual wooden block or body portion 104 which is provided with outwardly extending bristles 105. The bristles may be constructed of any desired material and may be varied in length so as to more closely follow the contour of the shoe. Each brush is mounted within a carrier which includes a U-shaped member 106 which encloses the upper end of the brush, as is clearly shown in Figure 22. The carrier also includes a plate 107 which is spaced from the top of the U-shaped member 106, being secured in such spaced relation by suitable rivets or pins 108. The pins 108 carry grooved rollers 109 and as is clearly shown in Figure 20, three of such rollers are provided. The rollers 109 are adapted to engage the track or rail 95, the edges of said rail engaging within the grooves of the rollers. One roller is located on one side of the rail, while a pair of rollers are disposed on the opposite side thereof and manifestly, the disposition of the rollers provide for a positive guiding movement of the carrier along the rail.

For securing each carrier to its brush, a pair of pilot pins or bolts 110 are provided and the lower ends of said pins or bolts are loosely mounted within openings 111 which are formed in a metallic plate 112. The plate 112 is fastened to the top of the body portion 104 of the brush by suitable screws 113. In this manner, the brush 103 is loosely mounted on the lower ends of the pilot pins 110. The upper ends of the pilot pins 110 extend through openings 114 which are formed in the top of the U-shaped member 106 and also through openings 115 which extend to the upper plate 107 of the carrier. Cotter keys or pins 116 project through the upper end of the pilot bolts or pins and serve to limit the downward movement of the brush with relation to the carrier. A coil spring 117 is confined within the U-shaped member 106 of the carrier and engages the plate 112 on the upper end of the brush, said spring being preferably soldered or otherwise secured to the member 106 and the plate 112. The spring 117 exerts its force downwardly to urge the brush downwardly with relation to the carrier. Due to the mounting of the brush 103 by means of the pilot pins 110, it is obvious that the brush may move upwardly with relation to the carrier and also since the pilot pins are loosely mounted within their respective openings, said brush may tilt to the various positions shown in dotted lines in Figure 22. Therefore, each brush is individually mounted to undergo a tilting movement relative to its carrier and this permits each brush to follow the contour of the shoe which it engages.

As explained, each track 95 has a pair of brushes 103 mounted thereon and the two brushes of each pair are connected to each other by means of a coil spring 118 (Figure 20). In addition, the upper plate 107 of each carrier is formed with a ball joint 119 which extends upwardly therefrom and this ball is confined within a socket 120. The socket 120 is formed at each end of a connecting rod 121 and said rod extends between the brushes 103 to connect the carriers of said brushes. Of course, the brushes may undergo a universal movement relative to the connecting rod 121 because of the ball and socket joints between said rod and said brushes. The central portion of the connecting rod has a collar 122 secured thereto and this collar is formed with a ball 123 adapted to be received within a socket 124. The socket 124 is formed on one end of a pitman 125, which pitman has its opposite end secured to the crank shaft 90. With this arrangement, it will be obvious that as the crank shaft 90 is rotated, a reciprocating movement is imparted to each pair of brushes 103 through their respective pitmans 125. The provisions of the ball and socket joints between the pitman and the connecting rod and between the connecting rod and the respective brushes, permits the brushes to undergo a universal movement with relation to the pitman.

Each pair of brushes are reciprocated along one of the track rails 95 and since said rail is twisted and curved, it will be obvious that the brushes will tilt during their movement along the track rail. By referring to Figure 6, it will be seen that the curvature and twisting of each track rail is such that the brushes will generally follow the contour of the shoe. Each pair of brushes will move from the heel of the shoe along one side thereof and then upwardly over the toe of said shoe. The crank shaft 90 and pitmans 125 are so arranged that when one pair of brushes is at the toe of the shoe, the other pair of brushes is located opposite the heel of said shoe. Thus the brushes move alternately over the toe, side and heel of the shoe and perform the brushing action. It is pointed out that the provision of the track rails 95 together with their particular curvature and twist makes it possible to positively guide the brushes in a path which simulates the manual brushing of the shoe. The universal mounting of the brushes, together with the individual mounting of each brush relative to its carrier, permits the brush to follow the contour of the shoe and to closely contact the entire surface thereof.

Operation

In the operation of the apparatus, the platform 13 is normally in its raised position, being latched in such position by the latch arms 24 which have their lugs 28 engaged beneath the shafts 26 on each side of said platform. At this time, the rollers 100 and 100a at the ends of the tracks 95 of the brush assembly are disposed in the upper portions of their respective grooves 101 and 101a, as shown in Figures 7 and 9. This position of the track rails 95 spaces the track rails outwardly away from each other, whereby the brushes 103 which are mounted on the rails are disposed adjacent the inner side of the guard plates or panels 12. The inner surfaces of the panels 12 may be provided with suitable containers 130, which may have a paste therein. Thus, when the brushes are in their uppermost position, said brushes contact the paste within the container 130.

When a person places his weight on the platform 13 with his shoes disposed within the recesses 11, and a coin 15 is inserted and the lever 16 operated, the latches 24 are swung outwardly through the medium of the yoke operating member 34, as has been explained. When the latches 24 are swung outwardly, the lugs 28 of said latches are disengaged from beneath the shafts 26, whereby the weight of the person may move the platform 13 downwardly to collapse the bellows 17 which is secured to the underside of the platform. As the bellows 17 is collapsed, the air from said bellows is forced outwardly through the pipes 43 and a portion of this air is forced into the liquid container 46 (Figure 11). This air which is passing outwardly through the pipes 43 and which is entering the liquid container 46 through the pipes 45, causes the liquid from the container 46 to be ejected outwardly through the pipes 48 and the nozzles 49. As has been pointed out, the nozzles 49 are located, one within each recess, whereby the liquid from the container 46 is sprayed onto the toes of the shoes within said recesses. This liquid may be either a polish or a cleaner as desired. Thus, as the platform is lowering downwardly, a liquid cleaner or polish is sprayed onto the toes of the shoes.

The downward movement of the platform also results in a downward movement of the track rails 95 and the brushes 103 carried thereby. Since the ends of the track rails are provided with the rollers 100 and 100a, said rollers are moved downwardly within their respective grooves 101 and 101a. As is clearly shown in Figure 8, the lower ends of the grooves which control each brush assembly are disposed closer to each other and therefore as the tracks move downwardly, such tracks of each assembly move inwardly toward each other. The inward movement of the track rails 95 of each brush assembly moves the brushes of each assembly inwardly into contact with the shoes on the platform 13. To compensate for shoes of various widths and to assure that the brushes will intimately engage said shoes, the grooves 101 and 101a may be provided with flat springs 101b which are disposed at the lower ends of said grooves, (Figures 7 to 9). These springs engage the rollers 100 and 100a and serve to urge the same inwardly toward each other, whereby the brushes are urged inwardly into contact with the shoes. Thus, it will be seen that as the platform 13 is lowered, the liquid polish is first applied to the shoes and then the brush assemblies are moved into a position engaging said shoes.

As the platform 13 is lowered, the counterbalancing weight 32 is raised and such raising of the weight 32 results in the lowering of the actuating block 54 (Figures 15 and 17). As the actuating block 54 moves downwardly its angular resilient lug 57 moves into engagement with the collar 87 which is slidably mounted on the contact rod 59. A continuous downward movement of the block 54 which results from the lowering of the platform to its lowermost position, causes the contact collar 87 to move into engagement with the contact bar 64, whereby an electrical circuit between the contact rod 59 and the contact bar 64 is closed. Assuming that the parts are in the position shown in Figure 15, the circuit to the winding MA of the motor 70 is closed, whereby the motor shaft 71 is rotated in a predetermined direction.

The operation of the motor shaft causes a rotation of the jack shaft 75 (Figure 4) and said jack shaft drives the threaded shaft 81 and also the crank shaft 90. Thus, as soon as the collar 87 closes the circuit to the contact bar 64, the crank shaft is operated to reciprocate the brushes 103 on the tracks 95. As explained, the brushes are guided by the curved and twisted tracks and are caused to reciprocate over the entire surface of the shoes on the platform 13 within the recesses 11.

As the motor continues to operate the threaded shaft 81, the collar 84 which is mounted on said shaft travels longitudinally of the shaft and finally reaches a position as shown in dotted lines in Figure 15. In such position, the collar 84 has travelled a sufficient distance to cause a swinging of the toggle lever 62, whereby the switch 63 has been actuated. Such swinging of the toggle lever causes a swinging of the contact rod 59, whereby the collar 87 is permitted to return to its uppermost position in engagement with the stop ring 88, such return of the collar being effected by the weight 90 and cable 89 which are secured to said collar. As the contact rod 59 is swung to the position shown in dotted lines in Figure 15, said rod moves into engagement with the opposite insulated end 65 of the contact bar 64, whereby a further flow of current to the motor is shut off. The swinging of the toggle lever 62 has shifted the possible flow of current through the switch 63, whereby upon the next operation, the other winding M of the motor will be energized.

Of course, the swinging of the rod 59 has moved the collar 87 below the other lug 58 of the actuating block 54 so that upon the next operation of the block, the lug 58 will strike the collar 87 to move the same downwardly into contact with the bar and thereby operate the motor shaft 71 in an opposite direction. The operation of the motor to rotate its shaft in an opposite direction will rotate the threaded shaft 81 in a reverse direction, whereby the collar 84 will travel back to its original position, as shown in full lines in Figure 15. During such travel, the toggle switch 62 will again be swung back to its original position, as shown in full lines in Figure 15, whereby the parts will again be ready for the next succeeding operation. Of course, the length of the flexible connection 85 will control the length of travel of the collar 84 and therefore, will control the length of time that the motor 70 is operated upon each actuation of the apparatus. By varying the length of the connection 85, the time that the motor 70 is energized may be accurately controlled.

After the motor 70 is halted, the brush assemblies will of course be stopped and when the person steps off of the platform 13, the counterbalancing weight 32 will serve to return said platform to its uppermost position. As the platform moves upwardly, the shafts 26 on each side of said platform serve to depress or move the latch members outwardly, whereby the shaft may again engage the upper end of the lugs 28, as is clearly shown in Figures 7 and 10. Of course, as the platform moves upwardly to its uppermost position, the tracks 95 of each brush assembly are again spread or moved outwardly with relation to each other due to the rollers 100 and 100a on said tracks riding to the upper end of the offset grooves 101 and 101a. This again disposes the brushes behind the guard plate or panel 12 so that the device is ready for the next operation. Upon the insertion of another coin, and operation of the lever 16, the platform may again be depressed to perform the various operations as above described.

It is pointed out that the brushes, being located behind the guard plate, cannot contact the shoes within the recesses 11 until the platform has moved to its lowermost position. The provision of the paste 130 on the inner surfaces of the panel 12 permits the paste to be applied to the bristles 105 of the brushes while said brushes are inactive in their uppermost position. Thus, the paste is applied in addition to the liquid cleaner or polish which is applied through the spray nozzles 49. The mounting of the brushes 103 is an important feature of the invention for said brushes may undergo a tilting or other movement so as to follow the contour of the shoes and remain in intimate contact therewith throughout all of the movements of said brushes. The provision of the guide tracks, which are curved and twisted in a desired manner make it possible to cause the brushes to travel in substantially the same manner as said brushes would be manually moved over the shoes. It is pointed out that the return of the platform to its raised position, as well as the actuation of the switch arrangement is controlled by weights, rather than by springs or other elements which are subject to wear. The use of the weights provides for a positive and efficient operation of the apparatus. Of course, although two brushes are shown as mounted on each track 95, it would be possible to elongate or slightly change the contour of the tracks, whereby they would accommodate more than two brushes.

What I claim and desire to secure by Letters Patent is:

1. A shoeshining apparatus including, a casing having a pair of shoe receiving recesses therein, a depressible member below the recesses and arranged to be lowered by the weight of the person standing thereon, a brush assembly associated with each recess and including brushes which are disposed on opposite sides of said recess, the brush assemblies being connected to the depressible member so as to be movable vertically with said member, means for normally maintaining the brushes of each assembly in a spread position out of engagement with the shoes within the recesses when the depressible member and brush assemblies are in a raised position, said means functioning to automatically move the brushes of each assembly inwardly toward each other upon downward movement of the member and brush assemblies, whereby said brushes are moved into engagement with the shoes within said recesses, and means controlled in its operation by the downward movement of the member for reciprocating the brushes to perform the polishing action.

2. A shoeshining apparatus including, a casing having a pair of shoe receiving recesses therein, a depressible member below the recesses and arranged to be lowered by the weight of the person standing thereon, a brush assembly associated with each recess and including brushes which are adapted to engage the shoe within said recess, a counterbalance weight within the casing connected with the depressible member and movable upwardly upon depression of the member, and means controlled in its operation by the upward movement of the weight for reciprocating the brushes of the brush assemblies to perform the polishing of the shoes.

3. A shoeshining apparatus including, a casing having a pair of shoe receiving recesses therein, a depressible member below the recesses and arranged to be lowered by the weight of the person standing thereon, latch means for normally locking the depressible member against downward movement, releasing means associated with the latch means and operable to actuate said latch means to release the member upon the insertion of a coin into the apparatus, a brush assembly associated with each recess and including brushes which are disposed on opposite sides of said recess, guide means including laterally divergent offset portions at the upper end thereof and engaged by each brush assembly for normally maintaining the brushes of each assembly in a spread position out of engagement with the shoes within the recesses when the depressible member is in a raised position, and means for moving the brush assemblies downwardly within the offset guide means to automatically move the brushes of each assembly inwardly toward each other upon downward movement of the member, whereby said brushes are moved into engagement with the shoes within said recesses, and means controlled in its operation by the downward movement of the member for reciprocating the brushes to perform the polishing action.

4. As a sub-combination in an apparatus, of the character described, a brush assembly including, a pair of spaced guide rails, each being twisted upon itself so that its rear portion which is located contiguous to the heel of the shoe disposed between the rails is in a vertical plane with its forward portion overlying the toe of the shoe in a horizontal plane, a pair of brushes mounted on each rail and movable therealong, a universal connection between said brushes, and means for imparting a reciprocating movement to said brushes.

5. As a sub-combination in an apparatus, of the character described, a brush assembly including, a pair of spaced guide rails, means for mounting the guide rails to undergo both vertical and lateral movement, each rail being twisted upon itself so that its rear portion which is located contiguous to the heel of the shoe disposed between the rails is in a vertical plane with its forward portion overlying the toe of the shoe in a horizontal plane, a carrier mounted on each rail and having guide rollers thereon which engage the edges of the rail to hold the carrier thereon, a rigid universal connection between each carrier and an operating member, whereby the carrier may move along the twisted rail, and a brush mounted in each carrier and having its bristles engaging the outer surface of the shoe between the rails.

6. As a sub-combination in an apparatus, of the character described, a brush assembly including, a pair of spaced guide rails, each being twisted upon itself so that its rear portion which is located contiguous to the heel of the shoe disposed between the rails is in a vertical plane with its forward portion overlying the toe of the shoe in a horizontal plane, end members fixed to said forward and rear portions, guide members, each including a recess having a laterally divergent offset portion at the upper end thereof, said recesses having the end members of the guide rails mounted therein so that they may be moved inwardly and outwardly with relation to each other, brushes mounted on said rails and movable therealong, and means for imparting a reciprocating movement to said brushes.

7. A shoeshining apparatus including, a casing having a pair of shoe receiving recesses therein, a depressible member below the recesses and arranged to be lowered by the weight of the person standing thereon, a brush assembly associated with each recess and including brushes which are adapted to engage the shoe within said recess, a counterbalance weight within the casing connected with the depressible member and movable upwardly upon depression of the member, and an actuating block connected to the weight and operable upon upward movement of said weight for setting the brush assemblies into operation to perform the brushing action.

8. A shoeshining apparatus including, a casing having a pair of shoe receiving recesses therein, a depressible member below the recesses and arranged to be lowered by the weight of the person standing thereon, a brush assembly associated with each recess and including brushes which are adapted to engage the shoe within said recess, a counterbalance weight within the casing connected with the depressible member and movable upwardly upon depression of the member, and electrically operated means controlled by the upward movement of the weight for reciprocating the brushes of the brush assemblies to perform the polishing of the shoes.

9. A shoeshining apparatus including, a casing having a pair of shoe receiving recesses therein, a depressible member below the recesses and arranged to be lowered by the weight of the person standing thereon, a brush assembly associated with each recess and including brushes which are adapted to engage the shoe within said recess, a counterbalance weight within the casing connected with the depressible member and movable upwardly upon depression of the member, an actuating block within the casing connected with the weight and movable downwardly upon upward movement of the weight, electrically operated means for reciprocating the brushes of the brush assemblies, and an electrical switch actuated by the downward movement of the block for controlling the actuation of the electrically operated means.

10. A shoeshining apparatus including, a casing having a pair of shoe receiving recesses therein, a depressible member below the recesses arranged to be lowered by the weight of a person standing thereon, a brush assembly associated with each recess and mounted on said depressible member, each brush assembly comprising a pair of brush units one on each side of the recess, a fixed guide member within the casing adjacent the ends of the depressible member and having guide means including laterally divergent offset portions at the upper end thereof, and means on the extremities of the brush units for engaging the guide means, whereby when the member is depressed the brush units carried thereby are caused to move inwardly with respect to the recesses simultaneously with their downward movement.

11. A shoeshining apparatus including, a casing having a pair of shoe receiving recesses therein, a depressible member below the recesses arranged to be lowered by the weight of a person standing thereon, a brush assembly associated with each recess and mounted on said depressible member, each brush assembly comprising a pair of brush units one on each side of the recess, a vertical guide element within the casing adjacent each end of the depressible member beyond the end of each recess, each guide element having a pair of vertical offset grooves which are spaced further at their upper ends than at their lower ends, and means on the extremities of the brush units for engaging within said offset grooves, whereby when the units are moved vertically by movement of the member, said grooves cause an inward and outward movement of said brush units.

12. As a sub-combination in an apparatus, of the character described, a brush assembly including, a pair of spaced guide rails, means for mounting the rails to undergo both vertical and lateral movement, each rail being twisted upon itself so that its rear portion which is located contiguous to the heel of the shoe disposed between the rails is in a vertical plane with its forward portion overlying the toe of the shoe in a horizontal plane, a brush unit mounted on each rail and comprising a pair of carriers which are connected to each other by a universal connection, guide rollers within each carrier engaging the edges of the rail, a brush secured to each carrier by a resilient mounting, and a single operating rod for each brush unit and connected thereto by a universal connection, whereby the brushes of each unit are reciprocated.

TILBERT L. FINLEY.